(12) United States Patent
Kilian et al.

(10) Patent No.: US 11,573,949 B2
(45) Date of Patent: *Feb. 7, 2023

(54) SEMANTIC DIFF AND AUTOMERGE (71) Applicant: Microsoft Technology Licensing, LLC, Redmond, WA (US)

(72) Inventors: David Charles Kilian, Arlington, VA (US); Louisa Rose Millott, Ann Arbor, MI (US); Gareth Alun Jones, Issaquah, WA (US); Andrew Craig Bragdon, Eastport, ME (US); Yu Xiao, Issaquah, WA (US); Arun Mathew Abraham, Redmond, WA (US); Kevin J. Blasko, Redmond, WA (US); Christopher Lovett, Woodinville, WA (US); Mark Groves, Monroe, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,451

(22) Filed: Mar. 12, 2021

(65) Prior Publication Data

US 2021/0200944 A1 Jul. 1, 2021

Related U.S. Application Data (63) Continuation of application No. 15/376,085, filed on Dec. 12, 2016, now Pat. No. 10,949,612, which is a continuation of application No. 13/435,636, filed on Mar. 30, 2012, now Pat. No. 9,519,631.

(51) Int. Cl.
| | | |
|---|---|---|
| *G06F 16/23* | (2019.01) | |
| *G06F 40/205* | (2020.01) | |
| *G06F 40/143* | (2020.01) | |
| *G06F 16/176* | (2019.01) | |
| *G06F 40/197* | (2020.01) | |

(52) U.S. Cl.
CPC ...... *G06F 16/2365* (2019.01); *G06F 16/1767* (2019.01); *G06F 40/143* (2020.01); *G06F 40/205* (2020.01); *G06F 40/197* (2020.01)

(58) Field of Classification Search
None
See application file for complete search history.

(56) References Cited

U.S. PATENT DOCUMENTS 6,901,403 B1 * 5/2005 Bata ................... G06F 16/26
7,263,691 B2 * 8/2007 Vehkomaki .......... G06F 40/211
717/140

(Continued)

*Primary Examiner* — Christopher J Raab
(74) *Attorney, Agent, or Firm* — Workman Nydegger (57) ABSTRACT

Resolving conflicting changes to structured data files. A method includes for a structured data file which has both a generic structure and dialects built on top of the generic structure, for which conflicting changes have been made, and where an original version of the structured data, a first version of the structured data and a second version of the structured data exist, determining a dialect of the structured data. The method further includes, based on the determined dialect performing at least one of merge or diff operations on the original version of the structured data, the first version of the structured data and the second version of the structured data.

20 Claims, 3 Drawing Sheets

(56) References Cited

U.S. PATENT DOCUMENTS

| | | | |
|---|---|---|---|
| 2004/0230886 A1* | 11/2004 | Livshits | G06F 8/71 |
| | | | 715/229 |
| 2007/0067373 A1* | 3/2007 | Higgins | G06Q 30/00 |
| 2011/0066626 A1* | 3/2011 | Dharmalingam | G06F 40/174 |
| | | | 707/758 |
| 2013/0111336 A1* | 5/2013 | Dorman | G06F 9/4843 |
| | | | 715/255 |

* cited by examiner

SEMANTIC DIFF AND AUTOMERGE

CROSS-REFERENCE TO RELATED APPLICATIONS

This application is a continuation of U.S. patent application Ser. No. 15/376,085, entitled "SEMANTIC DIFF AND AUTOMERGE", which was filed on Dec. 12, 2016, and which is to issue as U.S. Pat. No. 10,949,612 on Mar. 16, 2021, which is a continuation of U.S. patent application Ser. No. 13/435,636, entitled "SEMANTIC DIFF AND AUTOMERGE", which was filed on Mar. 30, 2012, and which issued as U.S. Pat. No. 9,519,631 on Dec. 13, 2016. The entire contents of each of these applications are incorporated by reference herein in their entireties.

BACKGROUND

Background and Relevant Art

Computers and computing systems have affected nearly every aspect of modern living. Computers are generally involved in work, recreation, healthcare, transportation, entertainment, household management, etc.

Data used with computing systems may be stored in a number of different ways. For example, data may be stored in databases or flat files. One method of storing data is storing the data in a structured text data file. Illustratively, XML files are structured text data files in which data can be stored. Structured data is data that has data organized in a fixed way. For example, databases may store certain types of data in specific fields. XML files may store certain types of data within a certain tag. The tag defines the type of data stored in the tag.

Stored data may be changed in a number of different ways. For example, when a user desires to change stored data, the user can lock the data from access by other users and change the data thereby preventing conflicting changes. However, there may be situations where stored data is not completely centrally located, but rather where copies of the stored data may be accessible by different users or on different devices at the same time. A user can change a copy of the stored data, but those changes will need to be synched with other copies and/or with a centralized copy. Further still, different copies may be changed, and may in fact have the same exact data changed in different ways in the different copies. When this has occurred, it may be desirable to merge changes, including resolving any conflicts in the data and/or to compare differences in different versions of the same files.

In some situations, a line based merge may be performed where lines of a file are compared and merged when data has been changed in one of the lines. However, a line based merge is often not smart enough to merge some structured data files. XML files are one example of such structured data files.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method practiced in a computing environment. The method includes acts for resolving conflicting changes to structured data files. The method includes for a structured data file which has both a generic structure and dialects built on top of the generic structure, for which conflicting changes have been made, and where an original version of the structured data, a first version of the structured data and a second version of the structured data exist, determining a dialect of the structured data. The method further includes, based on the determined dialect performing at least one of merge or diff operations on the original version of the structured data, the first version of the structured data and the second version of the structured data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement functionality to perform a merge operation of structured data files using semantics of files to perform the merge. Similarly, embodiments may be implemented that perform diff operations, to identify differences in structured data files.

Figure 1:
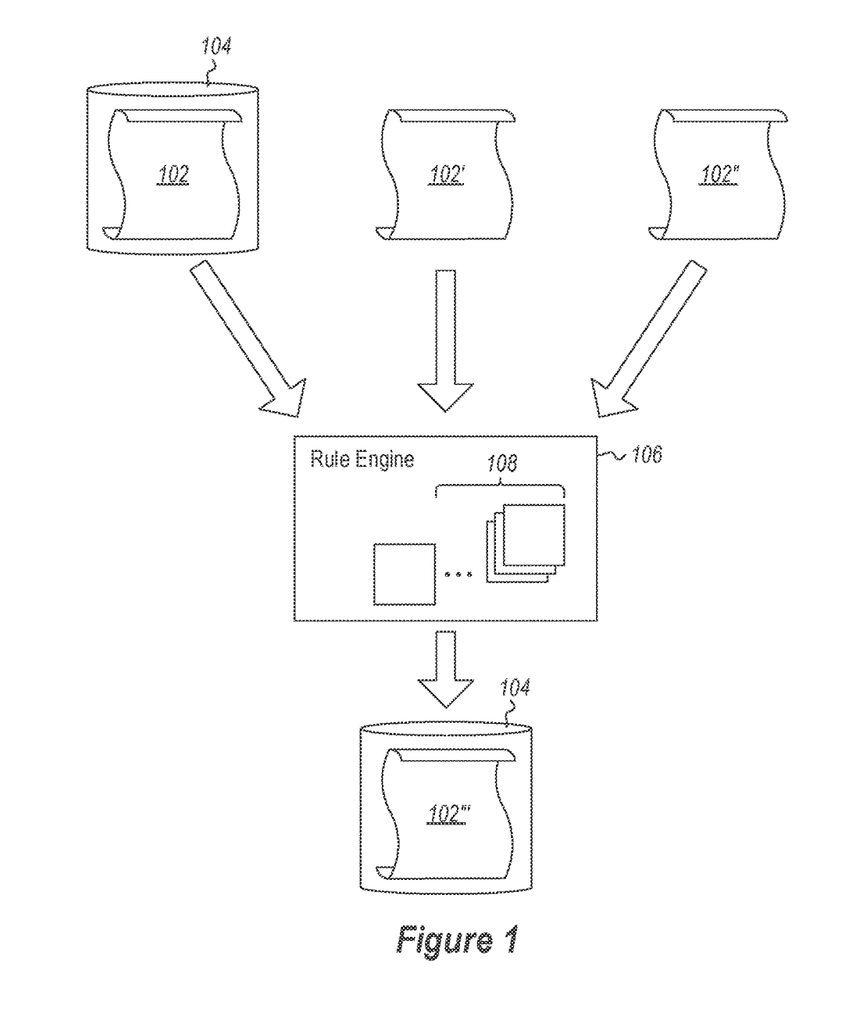
FIG. 1 illustrates different versions of structured data files and a rules engine for merging the different versions of structured text files.

Referring now to FIG. 1, an example is illustrated. When checking an XML file into source control, there may be the latest versions 102 in source control, the version 102' that was checked out, and a current workspace version 102". In particular, the source control will control the definitive or authoritative version of a structured data file. This version 102 is the publically accepted version or version that is generally considered as having the correct version of data. Thus, when users desire to change a structured data file, they check out the file from a source control file repository 104. The user may maintain a version 102' of the file that was checked out from the repository. The user may also maintain a workspace version 102" in which user changes are made.

The repository has the definitive version 102. The definitive version 102 may differ from the version 102' that was checked out if another user or device performs updates which cause the definitive version 102 to change.

A semantic automerge between these three files can ignore trivial changes that a line based merge cannot, and can successfully merge the three files fully automatically much more often than a line based merge can. To accomplish this, some embodiments may include a fully extensible rule engine 106 that can express various types of semantic properties for arbitrary file types. The rule engine 106 includes a set 108 of rules stored in rule files. A determination can be made as to the file type of the different versions 102, 102', and 102". Depending on the file type, a particular rule file from the set 108 of rules is selected and used by compute modules of the rules engine 106 to determine how the different versions 102, 102', and 102" should be merged.

In particular, some embodiments may support custom rules to support different file formats. In this way, different rule files from the set 108 of rules are selected depending on the file formats of the files being merged. In some embodiments, extensions may be implemented to automatically read and infer properties from metadata files for structured data files, such as schema definition XSD files for XML files. In some alternative embodiments, extensions may be implemented to support multi-file merge. Thus, rather than merging different versions of a file, completely different files can be merged. For example, different Unified Modeling Language (UML) projects created in Visual Studio® available from Microsoft® Corporation of Redmond Wash. may be merged into a single project. The rule file specifies the scope in which there can only be a single instance of a certain type of file. In the above example the scope is a Visual Studio® Solution available from Microsoft Corporation of Redmond Wash.

In some embodiments rule files from the set 108 of rules may be written in an XPath-based rules language. The rule files express semantic merge rules for arbitrary file types. In particular, the rule files may specify specific rules for structured data file dialects. The rule file may specify rules for particular portions of a file in a dialect specific fashion. For example, a rule file may specify that for some data file dialects that for certain portions of the file, the order of merging data items should be enforced. Alternatively or additionally, a rule file may specify that for some data file dialects that for certain portions of the file that no merging of those portions should be performed. Alternatively or additionally, a rule file may specify that for some data file dialects that for certain portions of the file that differences in certain attributes, such as certain XML attributes, should be ignored. Alternatively or additionally, a rule file may specify that for some data file dialects that for certain portions of the file that a unique identifier should be enforced. Other rules, though not specified specifically herein may be implemented.

In some embodiments, a user may be able to configure which file formats and portions of the structured data files to automatically merge using an options graphical user interface (GUI).

Embodiments may include functionality for handling merging of versions of files. In some situations, conflicts may not be able to be resolved automatically. As such, some embodiments include functionality for performing a partial merge of portions of a structured data file where conflicts can be resolved or do not exist and allowing un-resolved conflicts to remain. In some embodiments when there is a conflict, embodiments partially merge the non-conflicting changes, and then provide a GUI to a user allowing the user to view and resolve semantic conflicts.

Embodiments may further include functionality for merging changes to a structured data file while preserving human context recognizability. For example, when a human user looks at a document representation of a structured data file, various data items of the document facilitate the user's ability to read the document. For example, white space, such as space between paragraphs, tabbed column space, line breaks, and the like make a document more readable by a human user. Thus, embodiments may be configured to merge versions of documents while preserving white space in the documents. Embodiments may implement intelligent whitespace consistency and/or as-little-as-possible re-serialization. Preserving whitespace structure or formatting across the files may be performed, for example, by taking large pieces of a document across to the version into which it is being merged verbatim rather than by taking the document across to the version into which it is being merged piece by piece, line by line or data item by data item. For example, rather than simply preserving the exact whitespace, the "indent level" might be different because of other merged edits, therefore embodiments may not want to preserve the exact whitespace, but the intended formatting and automatically increase the indent level while maintaining the original formatting.

In another example, when a human user looks at a document representation of a structured data file, commenting may facilitate the user's ability to read the document. In particular, comments can be added to a structured data document, with the comments helping to explain the content of the document. Often, the comments are adjacent to the content to which they refer. Thus, some embodiments may facilitate a user's ability to read a document by preserving comment adjacency when merging versions of structured data files. Thus, embodiments may implement comment adjacency preservation whereby comments remain next to the data item they are commenting even after a merge operation has been performed.

Illustrating now additional details, the inputs to the rule engine 106 are three structured data files. The first is an original file, which is the version 102' that the user checked out from source control. The second is a current file, which is the version 102 currently in the source control. This version 102 may have been modified by other users or devices after the version 102' was checked out. Thus, the version 102 may differ from the version 102'. However, this version 102 may alternatively be identical to the version 102' that was checked out in the case where no changes were made to the source control version 102 after the version 102' was checked out. The third file is the latest file shown as the latest version 102". This is the user's workspace version 102" with modifications as input by the user.

The output of the merge is a "merged" version 102''' of the file. Note that in subsequent iterations of the process, the merged version 102''' becomes the latest version 102 in the source control file repository 104.

Some embodiments may be implemented as a three step process. The three steps include a two-way diff operation, a three-way diff operation, and a merge.

In some embodiments, a two-way diff operation is performed using the XmlDiff library available from Microsoft® Corporation of Redmond Wash. A diff operation is performed with two files as input, and the output being the differences between the two files. In one embodiment, a first diff operation, "Diff1", is performed to calculate the diff from the original version 102' that was checked out to the current workspace version 102". A second diff operation, "Diff2", is performed to calculate the diff from the original version 102' that was checked out to the latest version 102 stored in the source control file repository 104. Performing the diff operations from the original version 102' gives more context about the changes and helps to merge the files intelligently. The result of the two-way diff operations document Add, Update, Delete, and Move operations.

To perform the three-way-diff operation, embodiments traverse Diff1 and find any conflicting operations with Diff2. For example, a conflicting operation may be that Diff1 shows that a data item was deleted, and Diff2 shows that the same data item was updated. Conflicting operation pairs are placed in a conflict list. All non-conflicting operations in Diff1 and Diff2 are placed into a change list. This steps are repeated for Diff2, looking for conflicts in Diff1.

Figure 2:
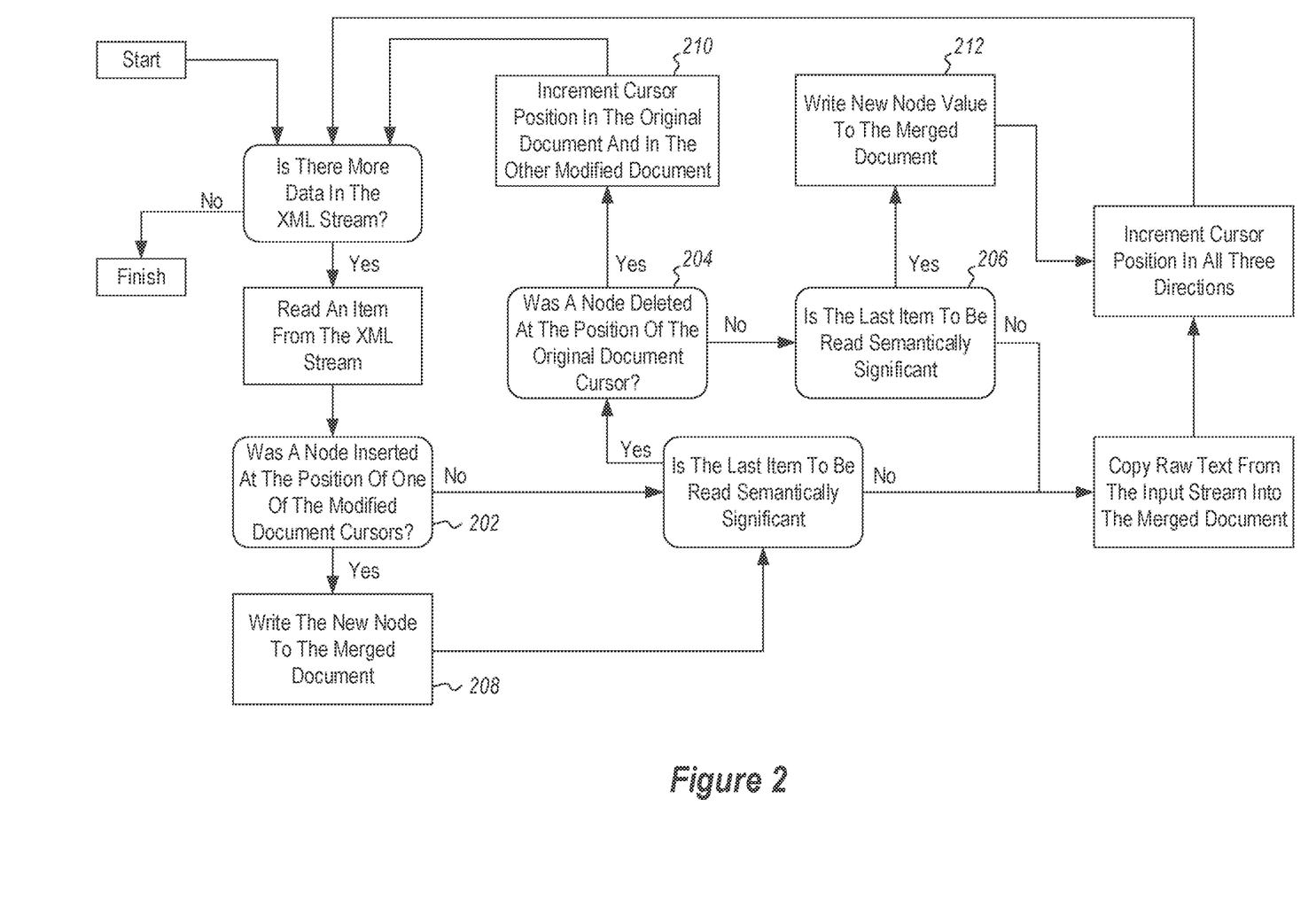
FIG. 2 illustrates an algorithm for merging structured data files.

Using the conflict and change lists, a merge can be performed. Referring now to FIG. 2, an example merge algorithm is illustrated. To perform the algorithm illustrated in FIG. 2, embodiments read the original version 102' of the file as a stream of data items tracking the cursor position (i.e. the current data item address) within all three documents being three-way merged. A determination is made as to whether or not there is an operation in the change list to be applied at one of cursors' current positions (as illustrated at 202 for inserted data items, 204 for deleted data items, and 206 for edited data items). If there is an operation in the change list to be applied at one of cursors' current positions, embodiments apply the operation (as illustrated at 208 for inserted data items, 210 for deleted data items, and 212 for edited data items. Otherwise embodiments pass the raw text through with no changes which achieves minimal re-serialization. If at the conclusion of the process, the conflict list is non-empty, embodiments allow the user to manually resolve the semantic conflicts using a GUI tool.

Referring once again to FIG. 1, a set 108 of rules, including a number of different rule files is illustrated. The rules may specify different XPath rules for file-type specific configurations. For common XML file types, embodiments may analyze the semantic properties using an XPath rules file that is setup for each file format. The analysis allows embodiments to better understand specific file types and merge them appropriately. For example, some rules may specify that certain data items should be ignored. In particular, embodiments may specify that conflicting changes to the attributes will be ignored and the merge will still be successful. In some embodiments, rules may specify ignoring the order of data items in a sibling list. Alternatively, in some embodiments, rules may specify that the order of data items in a sibling list may not be ignored. In some embodiments, rules may require unique ID's for data items. Two added data items with the same ID will be a conflict.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
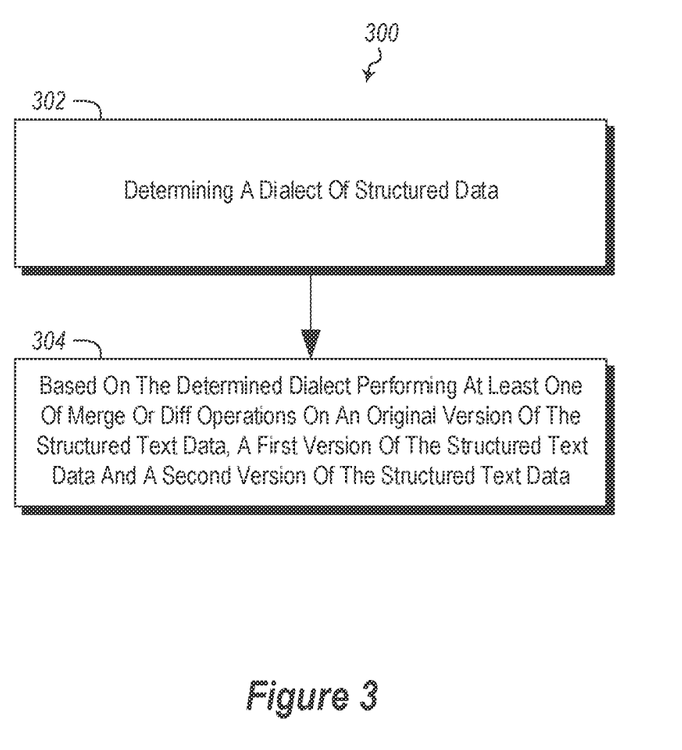
FIG. 3 illustrates a method of resolving conflicting changes to structured data files.

Referring now to FIG. 3, a method 300 is illustrated. The method 300 may be practiced in a computing environment. The method 300 includes acts for resolving conflicting changes to structured data files, such as XML documents. The method 300 includes determining a dialect of structured text data for a structured data file (act 302). The structured data file has both a generic structure and dialects built on top of the generic structure. For example, while XML documents have a generic structure, specific dialects may be built on top of this generic structure depending on the nature of data or desired organization of data within the XML document. Further, conflicting changes may have been made to the structured text data file. The conflicting changes may exist in an original version of the structured text data, a first version of the structured data and a second version of the structured data exist. Examples are illustrated above in FIG. 1, where there is an original version 102', a current version 102 and a latest version 102".

The method 300 further includes, based on the determined dialect performing at least one of merge or diff operations on all three versions of the structured data file act 304). FIGS. 1 and 2 and the descriptive text above illustrate various merge and diff operations that may be performed on the versions of structured data.

The method 300 may further include identifying a rule file associated with the determined dialect, such as a determined XML or other structured data dialect. FIG. 1 illustrates a set 108 of rule files. The method 300 may further include using the rule file, identifying different subsets of one or more of the three versions of the structured data file and at least one of different merge or diff rules associated with the different subsets of one or more of the three versions of the structured data file and applying the different rules to the different subsets of one or more of the three versions of the structured data file. For example, the rule file may include a rule specifying that a merge is not resolved for a particular subset of one or more of the three versions of the structured data file. For example, the rule file may specify portions of a document that should not be merged.

Alternatively or additionally, the rule file may include a rule specifying that order matters for at least one of merge or diff operations for a particular subset of the file. Alternatively or additionally, the rule file may include a rule specifying that order does not matter for at least one of the merge or diff operations for a particular subset of one or more of the three versions of the structured data file. For example, if two shopping baskets are being merged then the order of the data items in the shopping baskets typically do not matter. Whereas, if two travel itineraries are being merged, then the order might matter; in this case the order might be determined by the date of travel. Sometimes the order can be specified by an attribute of the data item (like a date), sometimes the order is implicit in the position the item appears in the file. The rule may specify how order is determined.

Alternatively or additionally, the rule file may include a rule specifying that differences in specific identified attributes do not matter for at least one of merge or diff operations for a particular subset of one or more of the three versions of the structured data file. For example, perhaps the attribute contains x and y coordinates for some tool to use in rendering the data, but perhaps that tools can recompute this layout information on the fly if it is missing. In this case the layout x and y attributes could be marked as ignorable, meaning an input data file could have an x value of 100 and another could have the value of 120 for the same data item. But the merge engine can ignore this difference and output either of these values in the merged result without raising a merge conflict error.

Alternatively or additionally, the rule file may include a rule specifying a subset of one or more of the three versions of the structured data file as requiring uniqueness such that two or more modified data items with the same unique identifier are in conflict. For example, data items in the structured data across different versions of a structured data file could be required to have different unique identifiers. Some such embodiments could automatically resolve conflicts where different changes have the same unique identifier by creating one or more new unique identifiers.

Alternatively or additionally, the rule file may include a rule specifying that a particular portion of one or more of the three versions of the structured data file should not be merged using any of the rules. In one such example, the latest version 102 will be used if conflicting changes have been made.

Embodiments of the method 300 may be practiced where using the rule file identifying different subsets of one or more of the three versions of the structured data file and at least one of different merge or diff rules associated with the different subsets of one or more of the three versions of the structured data file, includes following an Xpath expression. For example, an Xpath expression may be used to match subsets of one or more of the three versions of the structured data file and to parse the rule file rule for each section of one or more of the three versions of the structured data file to determine rules associated different parts of a file.

As noted above, the method 300 may include determining a dialect. This may be accomplished by examining a description document, such as an XSD document. Alternatively, this may be accomplished by examining a structured data file and recognizing the dialect based on data organization or properties in the structured data file.

The method 300 may further include automatically generating rules for at least one of semantic merge or diff operations based on previously existing semantic format descriptions for structured data. For example, XSDs for XML files may be used to generate rules for semantic merge and/or diff operations.

The method 300 may be practiced where the dialect specifies a related set of structured textual data to be operated on. For example, a UML diagram expressed in a data file may require a set of related data files expressing underlying data elements that are represented on that diagram. These related data files have diff or merge operations applied to them as a coherent, related set based on the specific dialect.

Embodiments of the method 300 may be practiced to further include merging the different versions while preserving human context recognizability. For example, merging the different versions while preserving human context recognizability may include preserving whitespace structure across the file. This may be accomplished by taking large pieces of a file across verbatim rather than by taking the document piece by piece, line by line or data item by data item. Alternatively or additionally, merging the different versions while preserving human context recognizability may include preserving comment adjacency. Commenting may facilitate the user's ability to read the document. In particular, comments can be added to a structured data document, with the comments helping to explain the content of the document. Often, the comments are adjacent to the content to which they refer. Thus, some embodiments may facilitate a user's ability to read a document preserving comment adjacency when merging versions of structured data files.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of resolving conflicting changes to structured data files, the method comprising:
    for a structured data file which has both a generic structure and dialects built on top of the generic structure, for which conflicting changes have been made, and where an original version of the structured data, a first version of the structured data and a second version of the structured data exist:
    determining a dialect that is used for the structured data, the determined dialect imposing semantic rules for determining differences in the structured data; and
    based on the determined dialect,
        performing a two-way diff comprising:
            determining a set of differences, diff1, between the original version of the structured data and the first version of the structured data,
            determining a second set of differences, diff2, between the original version of the structured data and the second version of the structured data, and
        performing a three-way diff comprising:
            traversing diff1 to:
                determine changes in diff1 which do not conflict with changes in diff2, and
                determine changes in diff1 which do conflict with changes in diff2, and
            traversing diff2 to:
                determine changes in diff2 which do not conflict with changes in diff1, and
                determine changes in diff2 which do conflict with changes in diff1; and
        performing a merge by:
            applying to the original version of the structured data non-conflicting changes in the differences between the original version and the first version and differences between the original version and the second version; and
            determining a set of conflicts between the differences between the original version and the first version and differences between the original version and the second version.

2. The method of claim 1 further comprising:
    identifying a rule file associated with the determined dialect;
    using the rule file, identifying different subsets of one or more of the three versions of the structured data file and at least one of different merge or diff rules associated with the different subsets of one or more of the three versions of the structured data file; and
    applying the different rules to the different subsets of one or more of the three versions of the structured data file.

3. The method of claim 1, further comprising resolving some or all of the determined conflicts automatically.

4. The method of claim 1, further comprising presenting a user interface enabled to receive input directing a resolution of one or more of the determined conflicts.

5. The method of claim 2, wherein the rule file comprises a rule specifying that order matters for at least one of merge or diff operations for a particular subset of one or more of the three versions of the structured data file.

6. The method of claim 2, wherein the rule file comprises a rule specifying that order does not matter for at least one of merge or diff operations for a particular subset of one or more of the three versions of the structured data file.

7. The method of claim 2, wherein the rule file comprises a rule specifying that differences in specific identified attributes do not matter for at least one of merge or diff operations for a particular subset of one or more of the three versions of the structured data file.

8. The method of claim 2, wherein the rule file comprises a rule specifying a subset of one or more of the three versions of the structured data file as requiring uniqueness such that two or more modified data items with the same unique identifier are in conflict.

9. The method of claim 8, further comprising resolving the conflict by creating one or more new unique identifiers.

10. The method of claim 2, wherein the rule file comprises a rule specifying that a particular portion of one or more of the three versions of the structured data file should not be semantically merged.

11. The method of claim 1 wherein determining a dialect comprises examining a description document.

12. The method of claim 1 wherein determining a dialect comprises examining the structured text data file.

13. The method of claim 1 further comprising automatically generating rules for at least one of semantic merge or diff operations based on previously existing semantic format descriptions for structured data.

14. The method of claim 1, wherein the dialect specifies a related set of structured textual data to be operated on.

15. The method of claim 1, further comprising merging the different versions while preserving human context recognizability.

16. The method of claim 15 wherein merging the different versions while preserving human context recognizability comprises preserving whitespace structure across the file.

17. The method of claim 15 wherein merging the different versions while preserving human context recognizability comprises preserving comment adjacency.

18. One or more computer readable storage devices comprising computer executable instructions that when executed by one or more processors cause one or more processors to perform the following:
    for a structured data file which has both a generic structure and dialects built on top of the generic structure, for which conflicting changes have been made, and where an original version of the structured data, a first version of the structured data and a second version of the structured data exist, determining a dialect of the structured data, the determined dialect imposing semantic rules for determining differences in the structured data; and based on the determined dialect,
  performing a two-way diff comprising:
    determining a set of differences, diff1, between the original version of the structured data and the first version of the structured data,
    determining a second set of differences, diff2, between the original version of the structured data and the second version of the structured data, and
  performing a three-way diff comprising:
    traversing diff1 to:
      determine changes in diff1 which do not conflict with changes in diff2, and
      determine changes in diff1 which do conflict with changes in diff2, and t
    traversing diff2 to:
      determine changes in diff2 which do not conflict with changes in diff1, and
      determine changes in diff2 which do conflict with changes in diff1; and
  performing a merge by:
    applying to the original version of the structured data non-conflicting changes in the differences between the original version and the first version and differences between the original version and the second version;
    determining a set of conflicts between the differences between the original version and the first version and differences between the original version and the second version; and
    resolving one or more of the determined conflicts by one or more of allowing the one or more conflicts to remain, resolving the one or more conflicts automatically, or presenting a user interface enabled to receive input directing a resolution of the one or more conflicts.

19. In a computing environment, a system for resolving conflicting changes to structured data files, the system comprising:
  one or more computer processors; and
  computer readable memory having stored therein computer executable instructions which, when executed on the one or more processors, configures the system to instantiate:
    a file repository configured to store a latest version of a structured text data file and to check the latest version of the structured text data file out to users, wherein the latest version of the structured text data file is an authoritative version of the structured text data file; and
  wherein, further, when executed on the one or more processors, the computer executable instructions configure the system to instantiate a rules engine configured to:
    determine a dialect for the structured data file which has both a generic structure and a dialect built on top of the generic structure, the determined dialect imposing semantic rules for determining differences in the structured data;
    select a rules file from among a plurality of rules files for the determined dialect; and
    based on the determined dialect, performing at least one of merge or diff operations on an original version of the structured text data, the latest version of the structured text data, and a workspace version of the structured text data using the rules file, performing at least one of merge or diff comprising:
      determining a set of differences, diff1, between the original version of the structured data and the latest version of the structured data,
      determining a second set of differences, diff2, between the original version of the structured data and the workspace version of the structured data,
      determining conflicts between the determined differences between the original version of the structured data and the latest version of the structured data and the determined differences between the original version of the structured data and the workspace version of the structured data by at least:
        traversing diff1 to:
          determine changes in diff1 which do not conflict with changes in diff2, and
          determine changes in diff1 which do conflict with changes in diff2, and
        traversing diff2 to:
          determine changes in diff2 which do not conflict with changes in diff1, and
          determine changes in diff2 which do conflict with changes in diff1; and
    resolving one or more conflicts between differences between the original version and the first version and differences between the original version and the second version by one or more of allowing the one or more conflicts to remain, resolving the one or more conflicts automatically, or presenting a user interface enabled to receive input directing a resolution of the one or more conflicts.

20. The system of claim 19, wherein the rules engine is further configured to generate rules based on a determined dialect.

* * * * *